July 25, 1961        A. MOSCH        2,993,586
POCKET UTENSIL HOLDER
Filed Jan. 27, 1958                           2 Sheets-Sheet 1
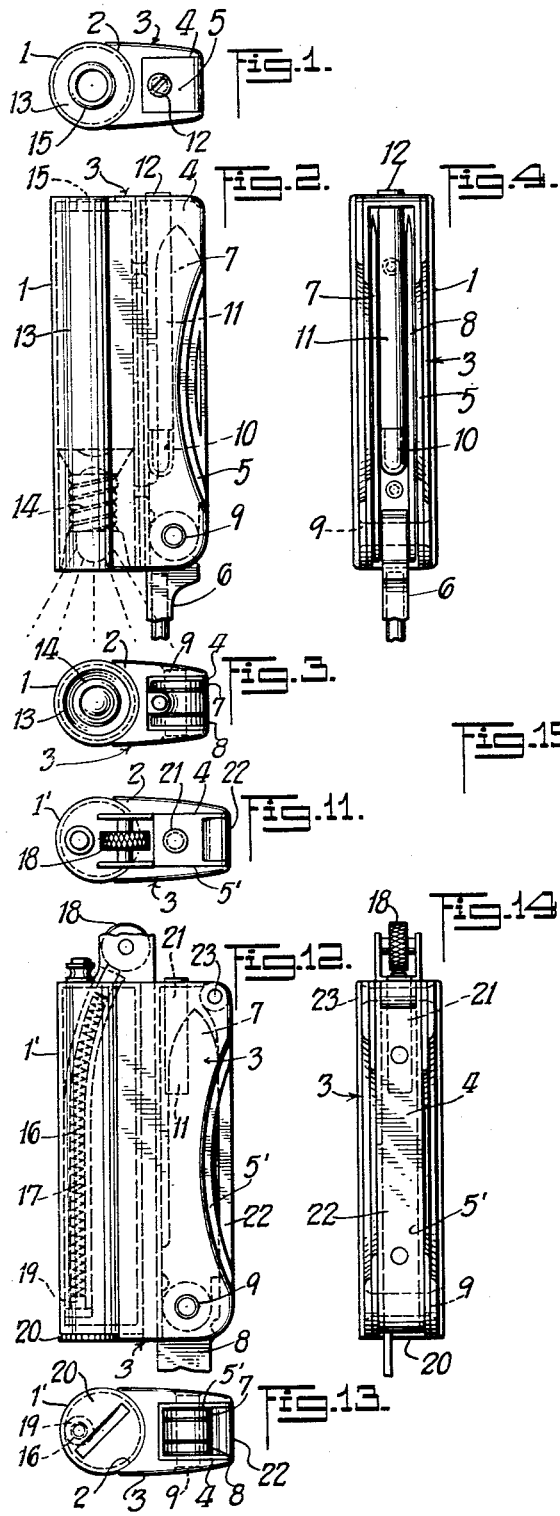
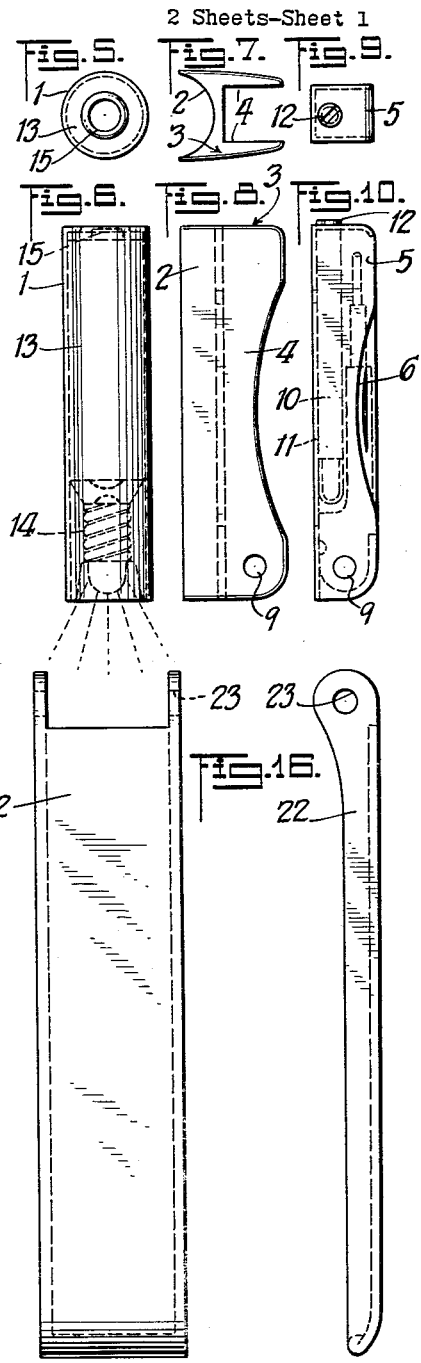
INVENTOR.
ALFRED MOSCH.
BY
K. H. Mayr
ATTORNEY.

July 25, 1961 A. MOSCH 2,993,586
POCKET UTENSIL HOLDER
Filed Jan. 27, 1958 2 Sheets-Sheet 2
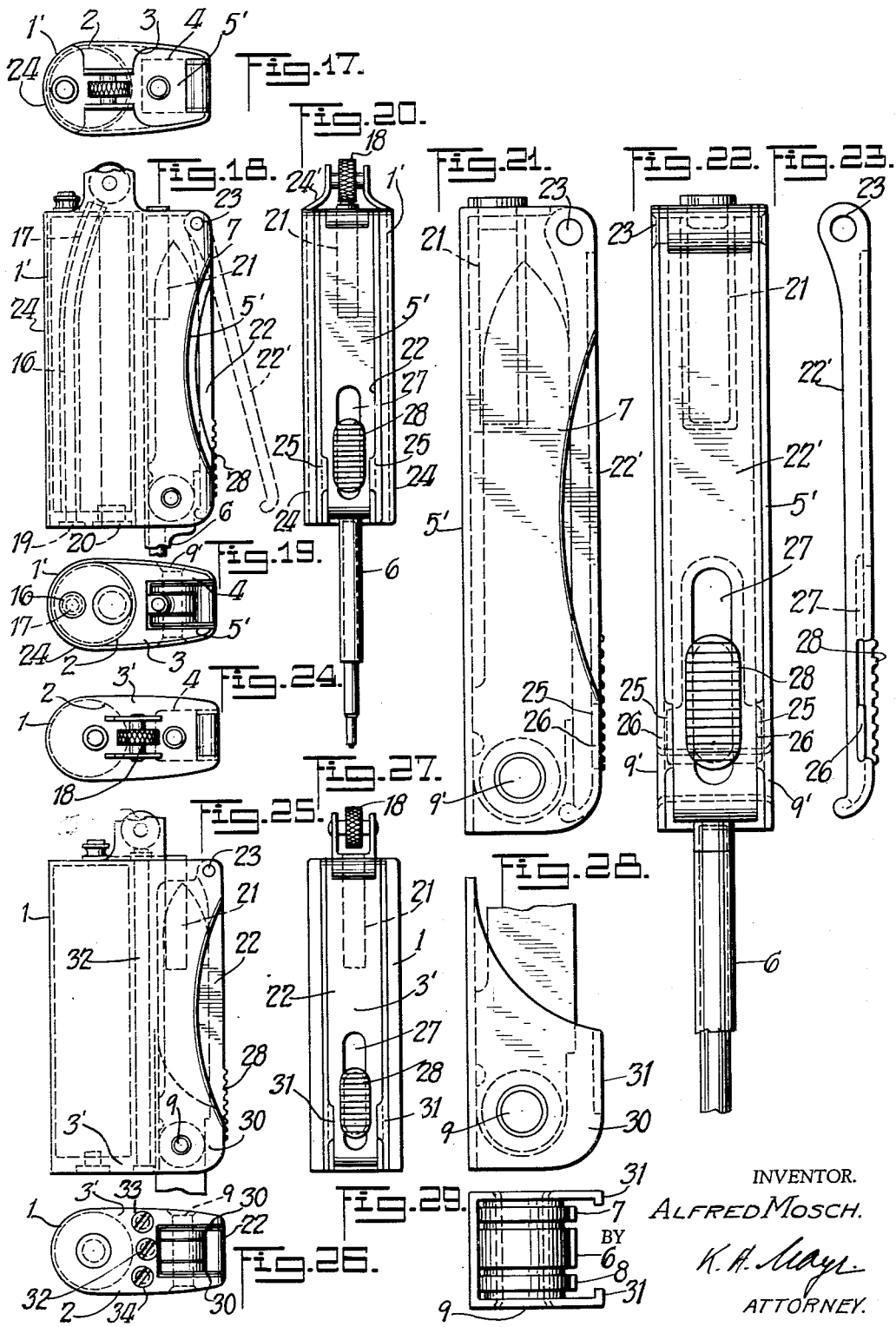
INVENTOR.
ALFRED MOSCH.
BY
K. H. Mayr
ATTORNEY.

United States Patent Office 2,993,586
Patented July 25, 1961

2,993,586
POCKET UTENSIL HOLDER
Alfred Mosch, 31—24 86th St., Jackson Heights, N.Y.
Filed Jan. 27, 1958, Ser. No. 711,348
5 Claims. (Cl. 206—38)

The present invention relates to a pocket utensil holder which is extremely compact and requires very little space. The device according to the invention has a minimum number of parts, though it contains a great number of utensils which are ready for use. The utensils include a pyrophoric lighter or a flashlight, a holder for an ink cartridge or a pencil, a knife, a bottle opener, a nail file, and the like.

To obtain the object set forth above I provide an oblong backbone or body member having on one side a recess of a substantially semicircular cross sectional confiugration and on the opposite side a recess of substantially rectangular cross sectional configuration. The first recess is suitable for receiving the fuel container of a lighter or the battery of a flashlight and the second recess is suitable for receiving a writing instrument and a set of tools which may be joined to form a separable unit or which may be individually connected with the body member.

In a modification of the device according to the invention a gate or cover may be hinged to the body member for closing the recess of rectangular cross section and covering and retaining the utensils in the recess when they are not used. The cover may be provided with a sliding lock for holding the cover in closed position.

In another modification of the invention the tools or utensils may be arranged in a separate holder which can be inserted in the recess of the body member or used separately and independently of the body member and to which a cover may be hinged and held in closed position by means of a sliding lock.

The body member may have cavities and/or bores accommodating spare utensils. If the device includes a lighter, a bore may be provided in the body member accommodating a flint and a spring for pressing the flint against a spark wheel.

The novel features which are considered characteristic of the invention are set forth with particularity in the appended claims. The invention itself, however, and additoinal objects and advantages thereof will best be understood from the following description of embodiments thereof when read in connection with the accompanying drawing in which:

FIG. 1 is a top view of a utensil holder according to the invention.
FIG. 2 is a side view of the holder shown in FIG. 1.
FIG. 3 is a bottom view of the holder.
FIG. 4 is a front view of the holder.
FIGS. 5, 7 and 9 are top views of individual parts of the utensil holder shown in FIGS. 1 to 4.
FIGS. 6, 8 and 10 are side views of the parts shown in FIGS. 5, 7 and 9, respectively.
FIG. 11 is a top view of a modified utensil holder.
FIG. 12 is a side view, FIG. 13 a bottom view, and FIG. 14 a front view of the utensil holder shown in FIG. 11.
FIG. 15 is a large scale front view of a cover forming part of the utensil holder shown in FIGS. 11 to 14.
FIG. 16 is a side view of the cover shown in FIG. 15.
FIG. 17 is a top view of a further modification of a utensil holder according to the invention.
FIGS. 18, 19 and 20 show a side view, a bottom view and a front view, respectively, of the utensil holder shown in FIG. 17.
FIG. 21 is a large scale side view of a unit forming part of a utensil holder according to the invention and including a plurality of utensils and a casing therefor with the utensils in rest position in which they are folded into the casing.
FIG. 22 is a front view of the unit shown in FIG. 21 with one utensil in operating position.
FIG. 23 is a side view of a cover forming part of the unit shown in FIGS. 21 and 22.
FIG. 24 is a top view of another modification of a utensil holder according to the invention.
FIGS. 25, 26 and 27 show a side view, a bottom view and a front view, respectively, of the device shown in FIG. 24.
FIG. 28 is a large scale side view of an auxiliary holder holding a plurality of utensils as used in the modification shown in FIGS. 24 to 27.
FIG. 29 is a bottom view of the unit shown in FIG. 28.

Like parts are designated by like numerals in different figures of the drawing.

The versatile utensil holder illustrated in FIGS. 1 to 4 includes a cylindrical casing 1 which is received and held in a recess or groove 2 of an oblong body member 3, the recess having a semicircular cross sectional configuration. On the opposed long side of the body member and separated by a narrow web portion from the first recess is a second recess or groove 4 of substantially rectangular cross sectional configuration. An auxiliary holder 5 is inserted into the second recess 4. This holder accommodates a plurality of utensils including an ink cartridge or pencil holder 6, a knife blade 7, and a bottle opener 8. The utensils are swingably connected with the body member 3 by a pvot 9. The pivot 9 may be used for riveting the auxiliary holder 5 to the body 3. A spare ink cartridge or a pencil 10 may be accommodated in a suitable receptacle 11 which is placed inside the auxiliary holder 5 and closed on top by means of a screw cap 12. The cylindrical casing 1 may contain a flashlight battery 13 and a light bulb 14, and may be provided with a conventional switch 15.

FIGS. 5 and 6 illustrate the flashlight 13 to 15 in the casing 1.
FIGS. 7 and 8 illustrate the body member 3.
FIGS. 9 and 10 illustrate the tool unit including the auxiliary holder 5, ready to be inserted in the rectangular recess of the body member 3.

In the modification shown in FIGS. 11 to 14 a pyrophoric lighter is inserted in the first recess or groove 2 of the body member 3. The lighter comprises a casing 1' which serves as a fuel container and through which a flint tube 16 extends, accommodating a spring 17 pressing a flint against a spark wheel 18. The lower end of the tube 16 is closed by a screw 19. The bottom end of the casing 1' is closed by a screw plug 20.

The rectangular recess 4 of the body member 3 of the modification shown in FIGS. 11 to 14 accommodates an auxilary holder 5' to which a plurality of utensils is swingably connected as in the modification shown in FIGS. 1 to 4. The receptacle 11 may be used for accommodating a spring 21 for actuating a snuffer cap, not shown, for the lighter and pivoted on top of the body member 3. The open side of the auxiliary holder or casing 5' is closed by means of a cover 22 having flaps which are pivoted at 23 to the holder 5'. The pivot 23 may be used for pivoting the auxiliary holder to the body member 3.

In the modification shown in FIGS. 17 to 20 a sheath 24 is provided all around the body member 3 whose first recess 2 accommodates a pyrophoric lighter as in the modification shown in FIGS. 11 to 16. The pivot 23 for the cover 22' interconnects the outer casing or sheath 24, the body member 3, and the auxiliary tool holder 5'. The pivot 9' on which the tools in the second recess 4 are swingable is used for interconnecting the sheath 24, the body member 3, and the auxiliary holder 5'.

The cover 22' for closing the open side of the recess 4 and holding the tools therein is provided with a lock including a latch having a finger hold portion 28 which is slidable on the face of the cover 22' and connected by a portion extending through a slot 27 in the cover with a plate which is slidable on the rear side of the cover and which is provided with lateral flaps 25 which are located beneath inwardly bent portions 26 of the side walls of the auxilary holder 5' when the lock is in closed position, i.e., in the position shown in the drawing. The latch is pushed upward to afford lifting of the cover and placing a tool into the operative portion (FIG. 22). The cover is then closed and the latch 28 pushed downward for locking the cover 22' in closed position in which it retains the selected tool in the operating position.

Whereas in the modification shown in FIGS. 11 to 16 the spark wheel 18 is rotatably mounted on a bracket connected with the body member 3 the flint wheel 18 in the modification shown in FIGS. 17 to 20 is rotatably mounted in flaps 24' extending from the top of the sheath 24.

In the modification shown in FIGS. 24 to 28 the auxiliary holder does not have a substantially box-like configuration as in the other modifications but is a short element 30 having U-shaped cross sectional configuration and being riveted by the pivot 9 to the lateral walls of the rectangular recess 4. The outer ends of the side portions of the element 30 are bent inwardly to form catches 31 for the lateral portions 26 of the latch 27 on the cover or gate member 22 which is swingably connected by pivot 23 to the portions of the body member 3' which form the rectangular recess 4.

A bore 32 extends through the web portion of the body member 3' for receiving a spring pressing a flint against the spark wheel 8. An additional bore or cavity 33 is provided in the body member 3' for receiving, for example, a spare ink cartridge or pencil. In a further bore or cavity 34 spare flints may be stored.

This application is a continuation-in-part application of my application Serial No. 492,284, filed March 4, 1955, now Patent Number 2,828,855.

I claim:

1. A utensil holder comprising an oblong body member having grooves in opposed long sides and extending longitudinally of the body member, said body member having a narrow web portion separating said grooves, the open sides of said grooves being averse, a single utensil received in a first one of said grooves, an auxiliary holder fitted in the second groove and having an open side, and a plurality of utensils movably mounted on said auxiliary holder and adapted to project through said open side when in operating position.

2. A utensil holder according to claim 1 wherein said single utensil has a substantially cylindrical cross section, said first groove having a corresponding substantially semicircular cross section and receiving a corresponding portion of said single utensil, said second groove having a substantially rectangular cross section and said auxiliary holder having a corresponding rectangular cross section.

3. A utensil holder according to claim 1, including a cover hinged to said auxiliary holder for closing said open side and retaining said utensils in said auxiliary holder.

4. A utensil holder according to claim 3, including a lock having a plate-like member slidably attached to the inside of said cover and having portions engaging said auxiliary holder when said plate-like member is in locking position for holding said cover in closed position.

5. A utensil holder as defined in claim 1, including a cavity in said web portion for receiving spare parts for said utensils.

References Cited in the file of this patent

UNITED STATES PATENTS

| | | |
|---|---|---|
| 1,486,294 | Morris | Mar. 11, 1924 |
| 2,558,265 | Mosch | June 26, 1951 |
| 2,630,212 | Mosch | Mar. 3, 1953 |